(12) United States Patent
Chun et al.

(10) Patent No.: US 7,989,520 B2
(45) Date of Patent: Aug. 2, 2011

(54) ANTIFOULING PAINT COMPOSITION

(75) Inventors: Ho Hwan Chun, Busan (KR); Inwon Lee, Busan (KR); Hyun Park, Busan (KR); Won Sub Chung, Busan (KR); Nam-Ju Jo, Busan (KR)

(73) Assignee: Pusan National University Industry-University Cooperation Foundation, Pusan (KR)

( * ) Notice: Subject to any disclaimer, the term of this patent is extended or adjusted under 35 U.S.C. 154(b) by 27 days.

(21) Appl. No.: 12/309,476

(22) PCT Filed: Mar. 28, 2008

(86) PCT No.: PCT/KR2008/001765
§ 371 (c)(1),
(2), (4) Date: Jan. 21, 2009

(87) PCT Pub. No.: WO2008/120922
PCT Pub. Date: Oct. 9, 2008

(65) Prior Publication Data
US 2009/0203824 A1  Aug. 13, 2009

(30) Foreign Application Priority Data

Apr. 2, 2007  (KR) .................. 10-2007-0032575

(51) Int. Cl.
| | |
|---|---|
| *C09D 5/16* | (2006.01) |
| *C09D 5/18* | (2006.01) |
| *C09D 5/14* | (2006.01) |
| *C08K 3/00* | (2006.01) |
| *C08K 3/38* | (2006.01) |
| *C08K 3/18* | (2006.01) |
| *C08K 3/22* | (2006.01) |
| *C08K 3/10* | (2006.01) |
| *A63B 37/00* | (2006.01) |

(52) U.S. Cl. .................... 523/122; 106/15.05; 106/18.3; 524/404; 524/433; 524/436

(58) Field of Classification Search ................ 524/423, 524/404, 433, 436; 523/122; 106/18.3, 15.05
See application file for complete search history.

(56) References Cited

U.S. PATENT DOCUMENTS

| | | | | |
|---|---|---|---|---|
| 4,021,392 A | * | 5/1977 | Milne et al. ............... | 424/78.09 |
| 4,191,570 A | | 3/1980 | Herting et al. | |
| 5,614,006 A | * | 3/1997 | Algar ........................ | 106/18.31 |
| 6,001,157 A | * | 12/1999 | Nogami ..................... | 106/18.3 |
| 6,110,990 A | * | 8/2000 | Nakamura et al. .......... | 523/122 |
| 6,294,006 B1 | * | 9/2001 | Andou ....................... | 106/14.05 |
| 7,118,616 B2 | * | 10/2006 | Gillard et al. ................ | 106/16 |
| 2005/0131099 A1 | * | 6/2005 | Gillard et al. ................ | 523/122 |
| 2007/0213426 A1 | * | 9/2007 | Abou-Nemeh ............. | 523/122 |

FOREIGN PATENT DOCUMENTS

| | | |
|---|---|---|
| GB | 1 457 590 | 12/1976 |
| JP | 2005-272802 | 10/2005 |
| KR | 2003-0051114 | 6/2003 |
| KR | 10-2008-0027718 | 3/2008 |
| KR | 10-2008-0104244 | 12/2008 |

OTHER PUBLICATIONS

Cotton, F.A., Wilkinson, G. Advanced Inorganic Chemistry, A Comprehensive Text. New York: Interscience Publishers, 1966.*

* cited by examiner

*Primary Examiner* — Vasu Jagannathan
*Assistant Examiner* — Anthony H Sheh
(74) *Attorney, Agent, or Firm* — Clark & Brody

(57) ABSTRACT

The present invention relates to an antifouling paint composition which is pro-environmental because it does not contain organotin and copper compound which are the major causes of maritime environmental pollution, and has excellent inhibitory effect on the adhesion of marine organisms on the surface. The antifouling paint composition of the present invention characteristically comprises a resin, tourmaline and an alkali metal, an alkali earth metal and/or an oxide thereof.

9 Claims, 1 Drawing Sheet

[Figure 1]
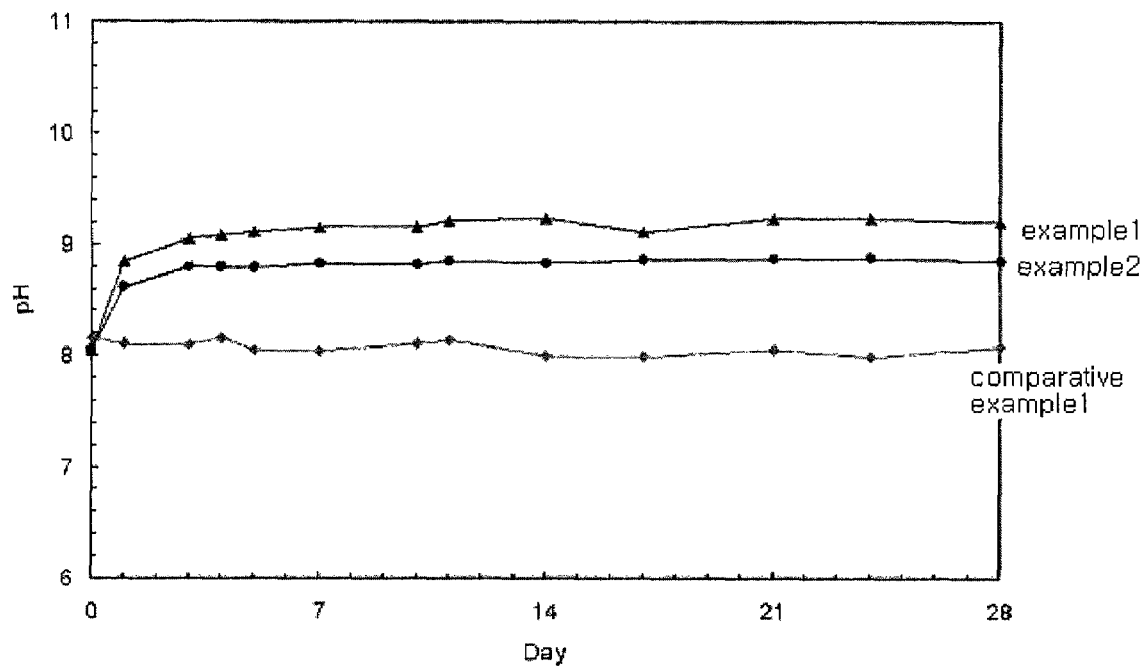

ANTIFOULING PAINT COMPOSITION

TECHNICAL FIELD

The present invention relates to an antifouling paint composition, more precisely a novel antifouling paint composition not containing organotin and cuprous oxide which are major causes of maritime environmental pollution.

BACKGROUND ART

Ships, sea bed structures and harbor facilities are getting damaged as soon as they are exposed on the ocean because many forms of marine organisms stick to them to cause damage. For an example, when marine organisms adhere to the surface of a ship and are growing thereon, frictional force between the surface and seawater increases during navigation, causing increase of fuel expenses.

To prevent the pollution by oceanic lives, the conventional antifouling paint composition prepared by mixing vinyl chloride resin or vinyl resin with rosin, a plasticizer and an antifouling agent, has been used. However, copper, mercury and organotin compounds used as an antifouling agent for the conventional antifouling paint composition cause maritime environmental pollution, which has been a serious environmental problem to be solved.

U.S. Pat. No. 4,191,570 and English Patent No. 1,457,590 describe the self-polishing antifouling paint composition in which organotin compound such as tributyltin oxide is combined as an ester form with unsaturated monomer such as acrylic acid or methacrylic acid so that the compositions can be hydrolyzed by seawater. The antifouling paint composition described in the above patents releases organotin from the seawater contact area and carboxyl group of this area forms a salt. As a result, the resin becomes hydrated and swelled, so that the resin is fallen apart from the surface to form another surface layer. This composition has been the most common antifouling paint so far but the use of this composition has been prohibited by International Maritime Organization since 2003 because the organotin compound released from the paint causes toxicity in marine organisms and imposex by being accumulated in oceanic lives.

An alternative paint has been developed to overcome the above problems, which is a tin-free antifouling paint. This paint is prepared by mixing tin-free resin with cuprous oxide and an organic antifouling agent. However, this antifouling paint also has a problem of toxicity caused by cuprous oxide and the organic antifouling agent eluted from the surface of a film of paint.

DISCLOSURE

Technical Problem

It is an object of the present invention to provide a novel antifouling paint composition which is a pro-environmental, specifically pro-marine environmental and pro-biological antifouling paint composition that does not include organotin and cuprous oxide but has excellent anti-pollution (caused by marine organisms and microorganisms) effect and is able to overcome toxicity problem of the conventional antifouling composition.

Technical Solution

The present invention is described in detail by the following embodiments established to overcome the above problem.

The antifouling paint composition of the present invention is composed of a resin component, the first antifouling component, the second antifouling component, a pigment and a solvent.

The resin used in this invention can be alkyd resin, polyester resin, rosin, chlorinated rubber resin, vinyl resin or self-polishing resin. The resin used in this invention takes the place of the conventional organotin polymer. The self-polishing resin is exemplified by metal carboxylate containing polymer and organosilicon ester group containing polymer, more precisely zinc acrylate polymer, copper acrylate polymer, silylacrylate polymer, etc. When these polymers are used alone as an antifouling paint, they retain the polishing rate of a film of paint at the level of that of the organotin polymer. But, the polishing rate of each varies as time passes and the resin itself cannot maintain antifouling capacity. Therefore, these compounds have to be used together with the composition of the present invention.

In this invention, in order to regulate the polishing rate of the metal carboxylate containing polymer, that is to regulate polishing speed, a self-polishing resin can be mixed with a rosin compound and at this time the content of the rosin compound is preferably 1-80 weight % for the self-polishing resin. The copper acrylate polymer contains a copper compound, but the restriction of the use of a copper compound is now under consideration by International Maritime Organization. Therefore, the use of a copper compound might be limited sooner or later.

The first antifouling component of the composition of the present invention is tourmaline. Tourmaline is a natural mineral classified as a silicate mineral. It varies from the mineral species, but generally it is 7~7.5 in hardness and 3~3.25 in specific gravity. It has pyroelectricity so that it pulls dusts when heated and has piezoelectricity so that it generates electric charge on the surface when pressurized so that it constantly generates small amount of anions. In this invention, any tourmaline can be used as the first antifouling component but in a preferred embodiment of the present invention, dravite or schorl of at least 1500 mesh in mean diameter is used as the first antifouling component and has the effect of strengthening the activity of the second antifouling component such as an alkali metal compound, an alkali earth metal compound or an metal oxide thereof. It is more preferred to use tourmaline of 250~5000 mesh in mean diameter.

The second antifouling component of the composition of the present invention is one or more compounds selected from the group consisting of alkali metals (Li, Na, K, Pb, Cs, etc), alkali earth metals (Be, Mg, Ca, Sr, Ba, etc) and metal oxides thereof. These compounds turn seawater around the film of paint into alkaline to inhibit the growth of adhered lives and are released as the natural compound form included in seawater, so that they do not affect the environment.

Marine environment is exposed on various changing factors. In general, the marine environment is alkaline and its acidity is affected by the content of carbon dioxide in the air, which is though generally regulated in the range of 8.0-8.3. Marine organisms are supposed to regulate their metabolisms to adapt themselves to the marine environment and have been evolved to get out of an abnormal environment or to be adapted to the changing environment.

In this invention, one or more compounds selected from the group consisting of alkali metals, alkali earth metals and metal oxides thereof are placed on the boundary surface between the film of paint and seawater to increase the acidity of the boundary surface to give antifouling capacity there. And, these compounds can be applied alone but when they are applied with tourmaline, the antifouling capacity improves significantly. The compound of the present invention is not limited as long as it has at least 250 mesh in mean diameter and preferably 5000~250 mesh.

The pigment of the present invention can be any conventional pigment acceptable in this field and its composition is not limited but preferably contains extenders or coloring pigments. The extender has low refractive index and is transparent during paint mixing not to be affected in the surface of a film of paint, which is exemplified by talc, mica, clay, calcium carbonate, kaolin, alumina white, white carbon, aluminum hydroxide, magnesium carbonate, barium carbonate, barium sulfate, bentonite, and mixtures thereof. The coloring pigment can be selected among general organic and inorganic pigments, which is exemplified by carbon black, phthalocyanine blue, royalblue, titanium white, bengala, barium oxide powder, chalk, iron oxide powder, zinc oxide and zinc powder, etc. The pigment of the present invention is not limited as long as it is up to 250 mesh in mean diameter and preferably 5000~250 mesh in mean diameter.

The solvent of the present invention can be selected from the group consisting of hydrocarbons such as xylene, toluene, ethyl benzene, cyclopentane, octane, heptane, cyclohexane and white spirit; ethers such as dioxane, tetrahydrofurane, ethyleneglycolmonomethylether, ethyleneglycolmonoethylether, ethyleneglycoldimethylether, ethyleneglycolmonobutylether, ethyleneglycoldibutylether, diethyleneglycolmonomethylether and diethyleneglycolmonoethylether; acetates such as butyl acetate, propyl acetate, benzyl acetate, ethyleneglycolmonomethylether acetate and ethyleneglycolmonoethylether acetate; ketones such as ethylisobutyl ketone and methylisobutyl ketone; and alcohols such as butanol and propanol.

To achieve the above object, the present invention provides an antifouling paint composition containing 5-50 weight % of a resin, 1-15 weight % of tourmaline, 1-20 weight % of an alkali metal or an alkali earth metal or a metal oxide thereof or a mixture thereof, 15-60 weight % of a pigment and 5-25 weight % of a solvent for 100 weight % of the composition.

The antifouling paint composition of the present invention can additionally contain various additives informed in this field.

The antifouling paint composition of the present invention is prepared by the conventional method for the paint composition production.

For example, a resin is completely dissolved in an organic solvent such as xylene, to which a pigment or the first or the second antifouling component is added one or more. The mixture was loaded in a miller or a stirrer, followed by mechanically forced even mixing and pulverizing.

DESCRIPTION OF DRAWINGS

The above and other objects, features and advantages of the present invention will become apparent from the following description of preferred embodiments given in conjunction with the accompanying drawings, in which:

FIG. 1 is a graph illustrating the time course changes of dissolution water of a film of paint.

BEST MODE

Practical and presently preferred embodiments of the present invention are illustrative as shown in the following Examples.

However, it will be appreciated that those skilled in the art, on consideration of this disclosure, may make modifications and improvements within the spirit and scope of the present invention.

Storage stability of the antifouling paint composition prepared above and antifouling capacity of the film of paint are examined as follows.

(1) Storage Stability

The prepared antifouling paint was stored at high temperature (60° C.) for 2 months and then observed by the naked eye to see if there was any change. Then, separation/sedimentation and re-dispersion characteristics were investigated.

(2) Antifouling Capacity of a Film of Paint

PVC plates (100 mm×300 mm×2 mm) were surface-treated with xylene. 3 copies of the sample were prepared. The antifouling paint compositions prepared in Examples and Comparative Examples were sprayed on the plates (3 plates/each composition) to make the dried thickness of the coating layer to be 150 μm. The painted plates were fixed on steel rack, which was immersed in seawater, followed by examination of antifouling capacity. The rack was dragged out every three months and slime and adhesion of marine organisms were observed by the naked eye. The results were evaluated by 5 grades as follows.

A: No adhesion of marine organisms was observed.

B: Thin slime layer was observed on the surface of the film of paint but no adhesion of marine organisms was observed.

C: Thick slime layer was observed on the surface of the film of paint and marine plants were adhered up to 20% of the effective area of the test plate but no animals were adhered thereon.

D: Marine plants were adhered on up to 50% of the effective area of the test plate but no animals were adhered thereon.

E: Marine plants were adhered on the whole effective area of the test plate or animals were adhered thereon.

Examples 1~11 and Comparative Examples 1~3

Antifouling paint compositions were prepared by mixing the compounds of Table 1 in 2 L vessels, according to the composition and composition ratio indicated in examples and comparative examples of Table 1, with stirring at 2000 rpm using a mechanical stirrer or a grinder. The physical properties of the compositions of examples and comparative examples are shown in Table 2 and FIG. 1. Table 2 presents storage stability and antifouling capacity of the compositions and FIG. 1 illustrates acidity changes of artificial seawater measured after leaving 5 test plates (PVC plates spray-coated with each composition on both sides to form a dried coating layer of 150 μm in 10 L of artificial seawater. In this invention, unless stated otherwise, the content is presented by weight %.

TABLE 1

| | example | | | | | | | | | | | comparative example | | |
|---|---|---|---|---|---|---|---|---|---|---|---|---|---|---|
| component | 1 | 2 | 3 | 4 | 5 | 6 | 7 | 8 | 9 | 10 | 11 | 1 | 2 | 3 |
| zinc acrylate polymer (a) | 12 | 12 | 12 | 18 | 18 | 18 | 18 | 18 | 24 | 24 | 24 | 12 | 18 | 24 |

TABLE 1-continued

| component | example | | | | | | | | | | | comparative example | | |
|---|---|---|---|---|---|---|---|---|---|---|---|---|---|---|
| | 1 | 2 | 3 | 4 | 5 | 6 | 7 | 8 | 9 | 10 | 11 | 1 | 2 | 3 |
| rosin (b) | 8 | 8 | 8 | 12 | 12 | 12 | 12 | 12 | 16 | 16 | 16 | 8 | 12 | 16 |
| tourmaline (c) | 20 | 10 | 10 | 20 | — | 20 | 10 | 10 | 20 | 10 | 10 | — | — | — |
| magnesium (d) | 10 | 20 | 10 | — | 10 | 10 | 20 | 10 | 10 | 20 | 10 | — | — | — |
| magnesium oxide (e) | 5 | 5 | 15 | — | 15 | 5 | 5 | 15 | 5 | 5 | 15 | — | — | — |
| zinc oxide (f) | 15 | 15 | 15 | 15 | 15 | 5 | 5 | 5 | 5 | 5 | 5 | 15 | 15 | 15 |
| titanium oxide (g) | 5 | 5 | 5 | 5 | 5 | 5 | 5 | 5 | 5 | 5 | 5 | 5 | 5 | 5 |
| iron oxide (h) | 5 | 5 | 5 | 5 | 5 | 5 | 5 | 5 | 5 | 5 | 5 | 5 | 5 | 5 |
| xylene (i) | 20 | 20 | 20 | 20 | 20 | 20 | 20 | 20 | 10 | 10 | 10 | 25 | 20 | 20 |
| talc (j) | — | — | — | 5 | — | — | — | — | — | — | — | 30 | 25 | 15 |
| total | 100 | 100 | 100 | 100 | 100 | 100 | 100 | 100 | 100 | 100 | 100 | 100 | 100 | 100 |

(a) self-polishing zinc acrylate polymer (Byucksan paint & coatings co., ltd, A/F 356)
(b) rosin
(c) tourmaline (schorl of the mean diameter 1500 mesh)
(d) magnesium (mean diameter 1000 mesh)
(e) magnesium oxide (mean diameter 1000 mesh)
(f) zinc oxide (mean diameter 1000 mesh)
(g) titanium oxide (mean diameter 1000 mesh)
(h) iron oxide (mean diameter 1000 mesh)
(i) xylene
(j) talc (mean diameter 1000 mesh)

TABLE 2

| items | | example | | | | | | | | | | | comparative example | | |
|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 |
| Storage stability | | Good | Good | Good | Good | Good | Good | Good | Good | Good | Good | Good | Good | Good | Good |
| Antifouling capacity | 3 months | A | A | A | A | A | A | A | A | A | A | A | C | C | C |
| | 6 months | B | A | A | B | B | B | A | A | B | A | A | E | E | E |
| | 9 months | B | A | A | B | B | B | A | A | B | A | A | E | E | E |
| | 12 months | B | A | A | C | C | B | A | A | B | A | A | E | E | E |

Evaluation of Antifouling Capacity of Compositions of Examples and Comparative Examples As shown in Table 2, the antifouling paints of the present invention containing at least one of the first antifouling component and the second antifouling component retains excellent antifouling capacity for a long term. But, the combined paints that did not contain the first or the second antifouling component showed no antifouling capacity. The first and the second antifouling components of the present invention are not harmful to marine environment, so that the antifouling paint composition of the present invention can be a promising alternative for the conventional antifouling paint composition containing organotin and copper compound, which are the marine pollutants.

FIG. 1 of the present invention illustrates the time course changes of acidity of artificial seawater measured after leaving the antifouling paint samples developed herein. As shown in FIG. 1, pH of the artificial seawater containing the paint not containing the first or the second antifouling component was constantly 8.0, unchanged. But, pH of the artificial seawater containing the antifouling paint of the present invention varied in the range of 8.0-10.0. So, adhesion of marine organisms can be prevented by changing acidity of the film of paint.

INDUSTRIAL APPLICABILITY

The antifouling paint composition of the present invention is pro-environmental and free from organotin, copper and mercury compounds, which has excellent antifouling capacity against contaminant organisms, so that it can be effectively used as an antifouling paint for ships and sea bed structures.

The invention claimed is:

1. An antifouling paint composition containing a polymer resin, tourmaline, one or more alkali earth metals, one or more alkali earth metal oxides, a pigment and a solvent.

2. The antifouling paint composition according to claim 1, wherein 100 weight % of the antifouling paint composition is composed of (A) 5-50 weight % of the polymer resin, (B) 1-15 weight % of the tourmaline, (C) 1-20 weight % of the alkali earth metals and oxides of alkali earth metals, (D) 15-60 weight % of the pigment, and (E) 5-25 weight % of the solvent.

3. The antifouling paint composition according to claim 2, wherein the tourmaline is powder of 250-5000 mesh in mean diameter.

4. The antifouling paint composition according to claim 2, wherein the resin is one or more resins selected from the group consisting of alkyd resin; polyester resin; rosin; chlorinated rubber resin; vinyl resin; and self-polishing resins; wherein the self-polishing resins are selected from the group consisting of zinc acrylate polymer, copper acrylate polymer and silyl acrylate polymer.

5. The antifouling paint composition according to claim 1, wherein the alkali earth metal is one or more compounds selected from the group consisting of Be, Mg, Ca, Sr and Ba.

6. The antifouling paint composition according to claim 5, wherein the alkali earth metals are magnesium and oxides of alkali earth metals are magnesium oxides.

7. The antifouling paint composition according to claim 4, wherein the self-polishing resin additionally includes rosin.

8. The antifouling paint composition according to claim 1, wherein the pigment is one or more extenders or coloring pigments selected from the group consisting of talc, mica, clay, calcium carbonate, kaolin, alumina white, white carbon, aluminum hydroxide, magnesium carbonate, barium carbonate, barium sulfate, bentonite, carbon black, phthalocyanine blue, royalblue, titanium white, bengala, barium oxide powder, chalk, iron oxide powder, zinc oxide and zinc powder.

9. The antifouling paint composition according to claim 8, wherein the solvent is one or more compounds selected from the group consisting of hydrocarbons such as xylene, toluene, ethyl benzene, cyclo pentane, octane, heptane, cyclo hexane and white spirit; ethers such as dioxane, tetrahydrofurane, ethyleneglycolmonomethylether, ethyleneglycolmonoethylether, ethyleneglycoldimethylether, ethyleneglycolmonobutylether, ethyleneglycoldibutylether, diethyleneglycolmonomethylether and diethyleneglycolmonoethylether; acetates such as butyl acetate, propyl acetate, benzyl acetate, ethyleneglycolmonomethylether acetate and ethyleneglycolmonoethylether acetate; ketones such as ethylisobutyl ketone and methylisobutyl ketone; and alcohols such as butanol and propanol.

\* \* \* \* \*